United States Patent [19]

Reisman

[11] 3,926,763

[45] Dec. 16, 1975

[54] METHOD FOR FABRICATING A GAS DISCHARGE PANEL STRUCTURE

[75] Inventor: Arnold Reisman, Yorktown Heights, N.Y.

[73] Assignee: International Business Machines Corporation, Armonk, N.Y.

[22] Filed: Nov. 30, 1972

[21] Appl. No.: 311,022

[52] U.S. Cl. .................... 204/192; 427/64; 313/201

[51] Int. Cl.² ...................... C23C 15/00; B44D 1/18

[58] Field of Search ...... 204/192, 15; 313/220, 201, 313/188, 221; 117/212, 106 R; 427/64

[56] References Cited

UNITED STATES PATENTS

| | | | |
|---|---|---|---|
| 2,217,334 | 10/1940 | Diggory et al. | 204/15 |
| 3,042,591 | 7/1962 | Cado | 204/15 |
| 3,432,417 | 3/1969 | Davidse et al. | 204/192 |
| 3,716,742 | 2/1973 | Nakayama et al. | 313/201 |
| 3,746,420 | 7/1973 | Baker | 313/201 |
| 3,776,613 | 12/1973 | Van Esdonk | 313/188 |

*Primary Examiner*—T. M. Tufariello
*Attorney, Agent, or Firm*—George Baron

[57] ABSTRACT

An improved glass panel gas discharge display structure wherein a photolithography step on a plate forming the glass panel is used before metallizing the plate through a mask so that when subsequent dissolution of the mask takes place, the plate is left with embedded metallization essentially coplanar with the surface. The effects of such an embedded electrode structure are that it minimizes attack of the metallization when flow on dielectrics are applied since the sidewalls of the electrodes are protected; it permits application of very thin dielectrics by flow-on, sputtering, plasma spraying, evaporation or other suitable techniques since problems of overcoating around edges are eliminated. It minimizes stresses in the composite structure overlying the substrate support and it minimizes adjacent line interactions when very thin coatings are applied. It also minimizes surface irregularities on panel plates.

8 Claims, 6 Drawing Figures

METHOD FOR FABRICATING A GAS DISCHARGE PANEL STRUCTURE

BACKGROUND OF THE INVENTION

Current glass panel structure consists of two similarly structured panels, having glass substrates, spaced approximately 4–5 mils apart. On each panel there is present a series of metallurgical line patterns in the form of parallel stripes, raised from the surface of the glass substrate. Each of the metallurgical lines consists of a sandwich of electrical conductors, for example, with a first layer of the sandwich of chromium, a middle layer of copper and a top layer of chromium. The copper serves as the metal that carries the half-select current to a "spot" of gas located between two orthogonally disposed similar sandwiches. The chromium wets the glass substrate so that the deposited copper adheres to the glass via the chromium. The top layer of chromium protects the copper from a subsequently deposited low temperature soft glass that is flowed-on and also provides adhesion to any glassy overcoat that might be applied This low temperature softening point glass serves as a dielectric layer to provide proper capacitive coupling of the field from the electrodes across the gas space and must be of correct and uniform thickness which depends on its dielectric constant. The reason that a low softening point glass is used is that during the process of its application, when a flow-on technique is employed, distortion of the underlying substrate must be avoided and attack of the thin and narrow metallurgy used in making glass panels must be minimized. However, low softening point glasses almost always contain lead and the latter tends to be very corrosive toward copper. When attempts have been made to passivate copper prior to covering the latter with soft glasses, reproduction has not been reliable. Furthermore, when the glass is melted over the raised metallurgy and, particularly when such glass layer is thin, the surface tends to be irregular, such irregularity being in the form of non-uniform undulations over such raised metallurgy.

Additionally, in those cases where very thin dielectrics must be employed over the raised metallurgy and the spacing between lines is exceedingly small, certain viscous dielectrics will not flow into the interstitial spacing between lines, leading to the imporper discharge between adjacent electrodes rather than between oposing electrodes due to varying capacitance.

THE INVENTION

A substrate of glass, which could be either hard or soft, is covered with masking material and by suitable photolithographic techniques, well known in the art, a fine line pattern is formed in the mask. The substrate is etched out through the mask by either wet chemical or sputter etching techniques. Where unit aspect ratio is desired, sputter etching is preferred.

The desired metallurgy is evaporated onto the etched surface of the panel at a temperature above room temperature. When the structure cools, the higher thermal coefficient of the metallurgy causes it to separate slightly from the walls of the recessed line etched out of the glass panel. consequently, during the normal use of the glass panel display, when the panel heats up somewhat or during thermal cycles during fabrication, the metallurgy while it will expand, will not create undue stress in the layered structure.

The mask and overlying metal are removed by blister peeling ord straight dissolution, leaving the pattern of conductors as an embedded metallurgy. Pure MgO or a mixture of $SiO_2$ and MgO or any other suitable dielectric of sufficient thickness to provide the required capacitance for the panel is coated over the panel. Such dielectric is evaporated, sputtered, plasma sprayed or melted. No matter what the procedure is, the metallurgy is protected by the glass walls against even the sue of a high viscosity molten dielectric, such as glass.

It is an object of this invention to fabricate a gas panel display having high reliability of performance.

Another object of this invention is to provide a glass panel display whose life is prolonged by the manner in which it is manufactured.

The foregoing and other objects, features, and advantages of the invention will be apparent from the following more particular description of the preferred embodiments of the invention as illustrated in the accompanying drawings.

DESCRIPTION OF THE DRAWINGS

As seen in FIG. 1, one begins with a glass substrate 2 which may have any reasonable dimensions, and a representative display chosen to illustrate the invention would be about 3 × 6 inches and about 0.125–0.250 inch thick. A suitable glass is identified by its manufacturer, Corning Glass co., as 7059 glass. Using appropriate masking and photolithography proceedings well known in the art, the surface of the glass 2 is covered with a mask 4 and then etched to a depth of 0.001 to 0.002. inches. While any suitable etchant can be used, as I-etch was employed which consists of a saturated solution of 40 percent ammonium fluoride and 60 percent water. 15 parts of phosphoric acid are mixed with 85 parts of the saturated solution of ammonium fluoride, and such mixture will etch the glass, at room temperature, at a rate of $1\mu$ per 10 minutes.

Figure 1:
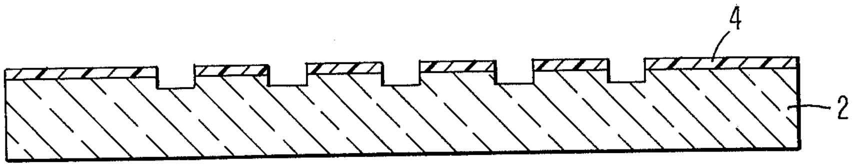
FIGS. 1 to 4 are the various steps, in sequence, followed in the manufacture of one of a similar pair of the improved glass panels forming this invention.
Figure 2:
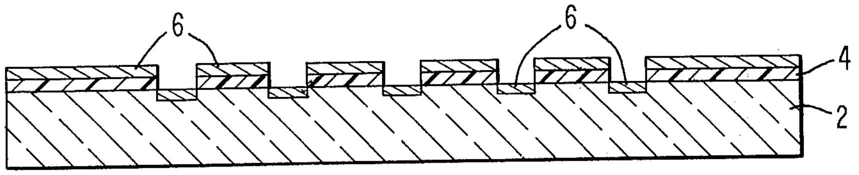

After the appropriate thickness of glass has been etched, as shown in FIG. 2, the glass panel is washed and the desired metallurgy 6 is deposited. Such metallurgy 6 could be a single metal, or a compound metal of chromium-copper-chromium, or any other single or compound metal suitable for the current requirements and operating temperature of the glass panel.

The mask 4 portion and metal 6 above it are removed either by blister peeling or dissolution of the mask, leaving the embedded metal 4 flush with the top surface of the glass, or such metal could be polished flat if it protrudes beyond that top surface, although this is unnecessary if metal deposition rate is carefully controlled. Pure MgO 8 or a mixture of $SiO_2$ and MgO, or other similarly functioning dielectric, is applied by sputtering or E-beam evaporation or other suitable means. Glasses may be sprayed on as a frit, then flowed-on by the application of heat, or they may be E-beam evaporated, plasma sprayed or sputtered onto the panel, over the buried metallurgy 4. This dielectric could be glass having an electron emitting substance incorporated therein whose thermal coefficient of expansion of the order of $6–9\times10^{-6}$, whereas metals have thermal coefficients of expansion that are many orders greater than that of glass. Consequently, when the panel is heated during application of the dielectric, the embedded metallurgy becomes more firmly embedded into its well, preventing incorporation of the dielectric between the wall of a well and its associated metallurgy.

It has been found to be particularly effective to contruct a panel wherein the coefficient of expansion of the substrate 2 and overlying dielectric layer 8 are the same. To achieve this, the same material that the substrate 2 is made of was either sputtered or E-beam evaporated onto it in the process of covering the metallurgy. In the case above, it would be necessary to apply to the structure so formed a thin top layer of a second material having a high secondary electron emissive coefficient if that of the original dielectric which was sputtered or E-beam evaporated is not high enough.

Figure 3:
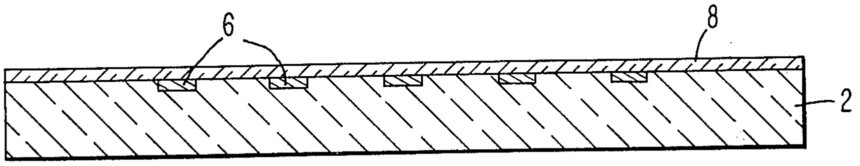
Figure 4:
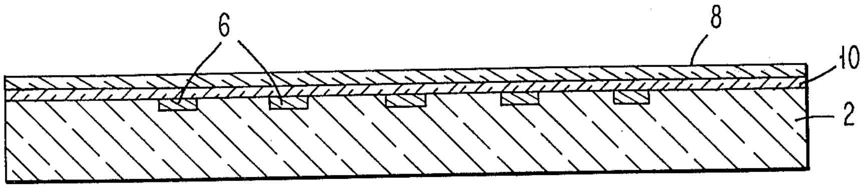

In FIG. 3, the dielectric 8 may serve the dual role of a dielectric and an electron emissive layer which isolates the matallurgy of one panel from the metallurgy of its companion panel that will be sealed to it and also be able to inject electrons into the gaseous material contained between the two sealed panels. In FIG. 4, the secondary electron emitting dielectric layer 8 need not be sputtered or applied otherwise directly onto the metallurgy. Instead, a glass or other suitable dielectric layer 10 is interposed between the metallurgy 6 and the electron emitting dielectric 8. In general, for a desired capacitance, the higher the dielectric constant of the glass 10 or the electron emitting dielectric 8, the thicker must these films be manufactured when compared with materials having a lower dielectric constant; and the softening points of either layer 8 or 10 must be greater than the sealing point of glass panel 2 when its companion is sealed to it.

Figure 5:
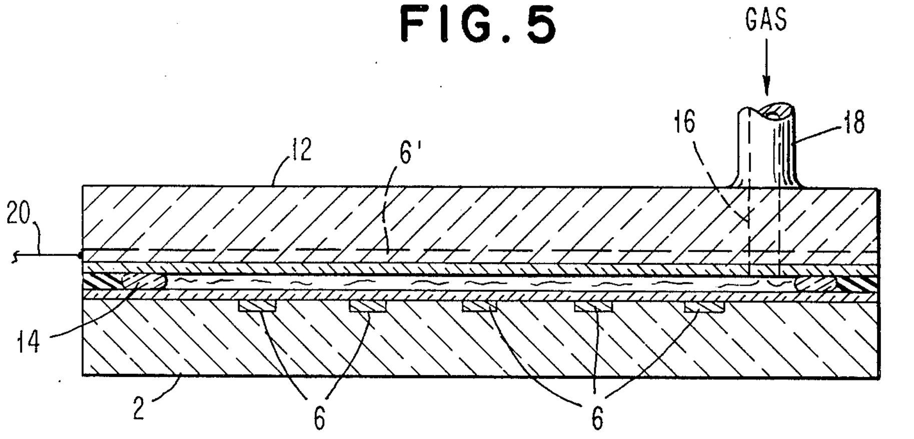
FIGS 5 and 6 are the final steps in manufacturing the completed glass panel.
Figure 6:
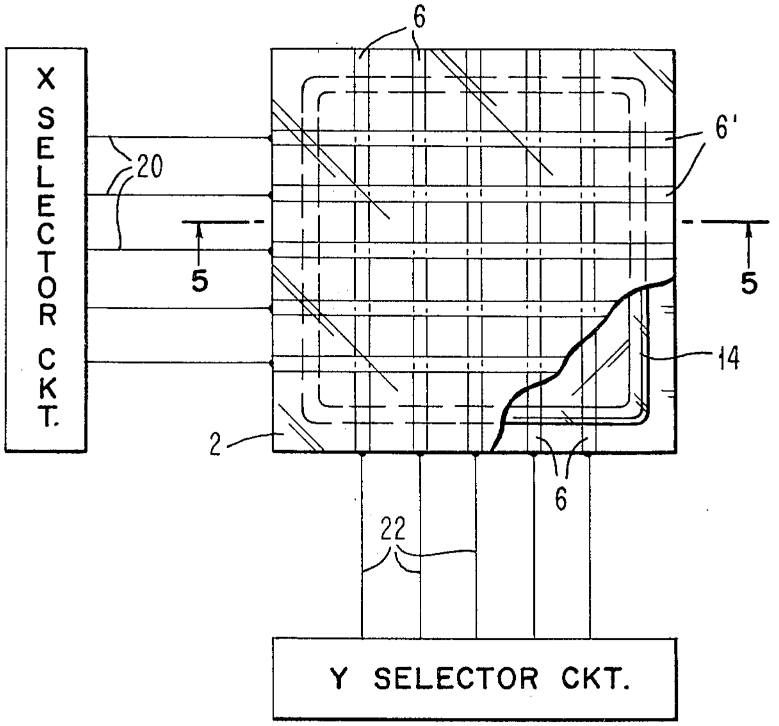

FIG. 5 illustrates how two glass panels, each made as illustrated in FIGS. 1–4, are made into a display. The top panel 12 is placed atop of panel 2 with the parallel metallurgy 6' of the top panel at right angles to the parallel metallurgy 6 of the lower panel. A representative sealing material is one made in the form of a rectangular frame 14 of a solid tubular shaped glass rod 4–6 mils in diameter or of a glass tape or a glass frit. It is placed on the top of panel 2 and the second panel is positioned above the first panel 2 so that all the parallel metal lines of one panel are orthogonal to all the parallel metal lines of the second panel. The two panels are secured in position and weights are placed on the top panel 12 and a shim is interposed at the plate edges to set minimum plate separation as heat is applied uniformly to both panels. After a predetermined time, the sealing glass 14 and panels 2 and 12 fuse together, with the diameter of the sealing glass rod 14 or sealing glass tape now depressed to a level where the spacing between panels is 3–4 mils.

A hole 16 is drilled only through one of the two glass panels 2 or 12 and a tube 18 is glass soldered to that opening. The 3–4 mil spacing between the two panels is evacuated through such tube 18 and a mixture of neon and one-tenth percent of argon or other suitable gas mixture is inserted through the tube to a pressure of 350–550 Torr. The hole 16 is sealed off after the ionizable gas has been inserted by tipping off the tube 18 and suitable current-carrying leads 20 and 22 are connected to each metal line of both glass panels. As is known in the art, and is not a part of the present invention, coincident currents passing through two orthogonally disposed conductors will ionize tha gas, causing the latter to become light-emitting in the panel in the immediate vicinity of the intersection of such conductors. Lower voltages through said conductors 20 and 22 are needed to maintain such gas in its glowing condition. Erasure of information, or quenching of the light at a location, occurs when simultaneous voltages of a polarity opposite to that used for igniting a spot are sent through a pair of orthogonal conductors associated with that spot.

I claim:

1. A method for fabricating one panel of a gas discharge display structure comprising the steps of:

a. providing a supporting base of glass having a top surface, b. etching uniform parallel grooves in said top surface, said grooves having a depth of 0.0001 to 0.0002 inches, c. filling said grooves with electrically conducting material, and d. applying a thin uniform planar layer of dielectric material over said top surface to cover said electrically conducting material.

2. The method of claim 1 wherein said dielectric material over said top surface has an electron emissive material incorporated therein.

3. The method of claim 2 wherein said electron emissive material is magnesium oxide.

4. A method for fabricating one panel of a gas discharge display structure comprising the steps of:

a. providing a supporting base of glass having a top surface, said glass having a predetermined coefficient of expansion, b. etching uniform parallel grooves in said top surface, said grooves having a depth of 0.0001 to 0.0002 inches, c. filling said grooves with electrically conducting material, and d. sputtering a thin uniform planar layer of dielectric material over said top surface to cover said electrically conduction material, said dielectric material having substantially the same coefficient of expansion as said glass.

5. A method for fabricating a gas discharge display panel comprising the steps of:

a. providing a supporting base of glass having a top surface, said glass having a predetermined coefficient of expansion, b. etching uniform parallel grooves in said top surface, said grooves having a depth of 0.0001 to 0.0002 inches, c. filling said grooves with electrically conducting material, d. sputtering a thin uniform planar layer of dielectric material over said top surface to cover said electrically conducting material so as to form a single unit of said gas panel, said sputtered dielectric material having substantially the same coefficient of expansion as said glass, e. disposing a second panel, made in the manner set forth hereinabove, above said first panel so that its electrically conducting lines are orthogonal to the electrically conducting lines of said first panel, f. providing a rectangularly glass shim on the border of and between said two panels, and g. fusing said shim and glass panels together so that a space exists between said sealed panels.

6. The method of claim 5 wherein the space between sealed glass panels is evacuated and provided with an ionizable gas after evacuation.

7. A method for fabricating one panel of a gas discharge display structure comprising the steps of:

a. providing a supporting base of glass having a top surface, b. etching uniform parallel grooves in said top surface, said grooves having a depth of 0.0001 to 0.0002 inches, c. filling said grooves with electrically conducting material, and d. electron beam evaporating a dielectric layer over said metallurgy and top surface so as to provide a planar layer of said dielectric.

8. The method of claim 1 including the step of applying a thin electron-emitting dielectric layer to said dielectric material.

* * * * *